(12) United States Patent
Peterson

(10) Patent No.: US 8,442,020 B1
(45) Date of Patent: May 14, 2013

(54) PHASE COMPENSATION SYSTEM AND METHOD TO CORRECT M-CODE DUAL SIDEBAND DISTORTION

(75) Inventor: Todd D. Peterson, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 795 days.

(21) Appl. No.: 11/519,421

(22) Filed: Sep. 12, 2006

(51) Int. Cl.
*H04B 7/216* (2006.01)

(52) U.S. Cl.
USPC .............................. 370/342; 455/23; 455/139

(58) Field of Classification Search .................. 370/342, 370/320; 342/357.02
See application file for complete search history.

(56) References Cited

U.S. PATENT DOCUMENTS

| | | | |
|---|---|---|---|
| 4,621,365 A * | 11/1986 | Chiu | 375/149 |
| 4,689,626 A | 8/1987 | Hori et al. | |
| 5,347,284 A * | 9/1994 | Volpi et al. | 342/356 |
| 5,576,715 A | 11/1996 | Litton et al. | |
| 5,736,961 A | 4/1998 | Fenton et al. | |
| 5,901,183 A | 5/1999 | Garin et al. | |
| 5,903,654 A | 5/1999 | Milton et al. | |
| 5,963,582 A | 10/1999 | Stansell, Jr. | |
| 6,160,841 A | 12/2000 | Stansell, Jr. et al. | |
| 6,191,731 B1 | 2/2001 | McBurney et al. | |
| 6,272,189 B1 | 8/2001 | Garin et al. | |
| 6,292,748 B1 | 9/2001 | Harrison | |
| 6,480,788 B2 | 11/2002 | Kilfeather et al. | |
| 6,546,040 B1 | 4/2003 | Eschenbach | |
| 6,725,158 B1 | 4/2004 | Sullivan et al. | |
| 6,731,672 B1 | 5/2004 | Eschenbach | |
| 6,859,690 B2 | 2/2005 | Asher et al. | |
| 6,903,684 B1 | 6/2005 | Simic et al. | |
| 6,931,056 B2 | 8/2005 | Goodings | |
| 7,375,680 B2 * | 5/2008 | Watson et al. | 342/357.02 |
| 7,579,984 B2 * | 8/2009 | Wang et al. | 342/357.59 |
| 2003/0218568 A1 * | 11/2003 | Kober et al. | 342/357.12 |
| 2006/0227856 A1 * | 10/2006 | Ledvina et al. | 375/150 |
| 2007/0237269 A1 * | 10/2007 | Lillo et al. | 375/343 |

OTHER PUBLICATIONS

Barker, et al "Overview of the GPS M Code Signal," Feb. 14, 2006, cited from web address: www.mitre.org/work/tech_papers/tech_papers00/betz_overview/betz_overview.pdf Interim Test Receiver Report III for the MUE PRDA addendum for Interim Test Receiver Report II, pp. 1, and 81-114, Feb. 28, 2005.

* cited by examiner

*Primary Examiner* — Marcos Batista
(74) *Attorney, Agent, or Firm* — Donna P. Suchy; Daniel M. Barbieri

(57) ABSTRACT

A system and method of generating a position is disclosed. The system and method are configured for receiving from a transmitter an M-code signal, the M-code signal modulated with a pseudorandom number sequence. The system and method are also configured for down converting the received M-code signal to a baseband signal. Further, the system and method are configured for correlating the baseband signal with a known pseudorandom number sequence. Further still, the system and method are configured for processing the converted baseband signal to remove errors due to phase distortion of the M-code signal.

13 Claims, 12 Drawing Sheets

BOC Processing

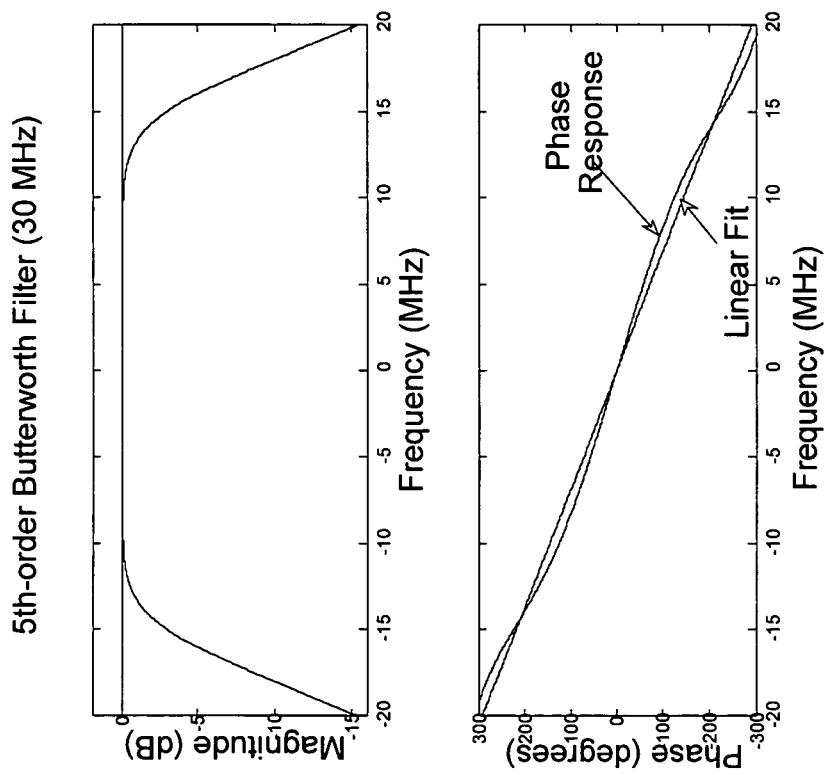
Figure 1. Magnitude and phase response of a 30 MHz wide fifth-order Butterworth filter.

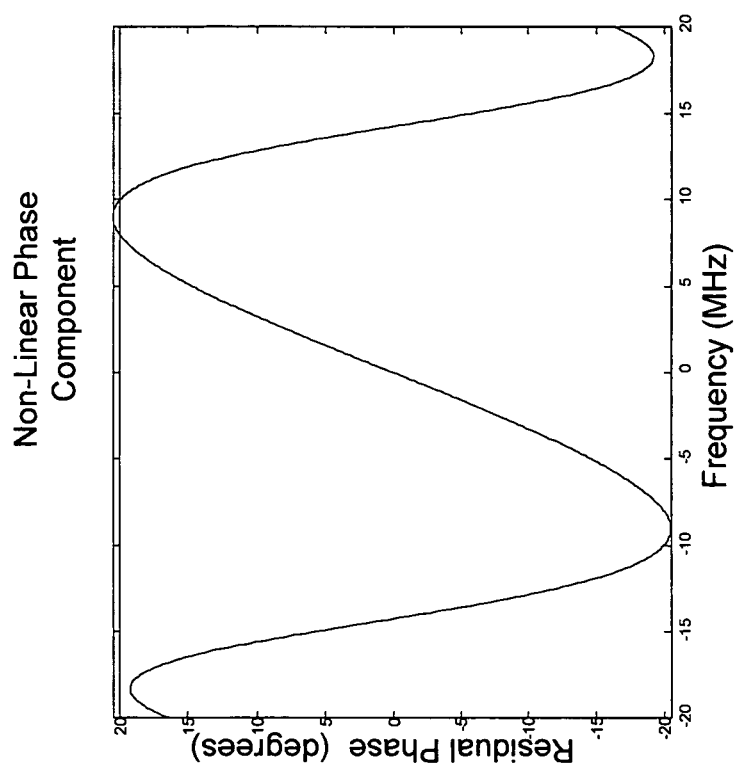
Figure 2. Residual phase with respect to a linear fit

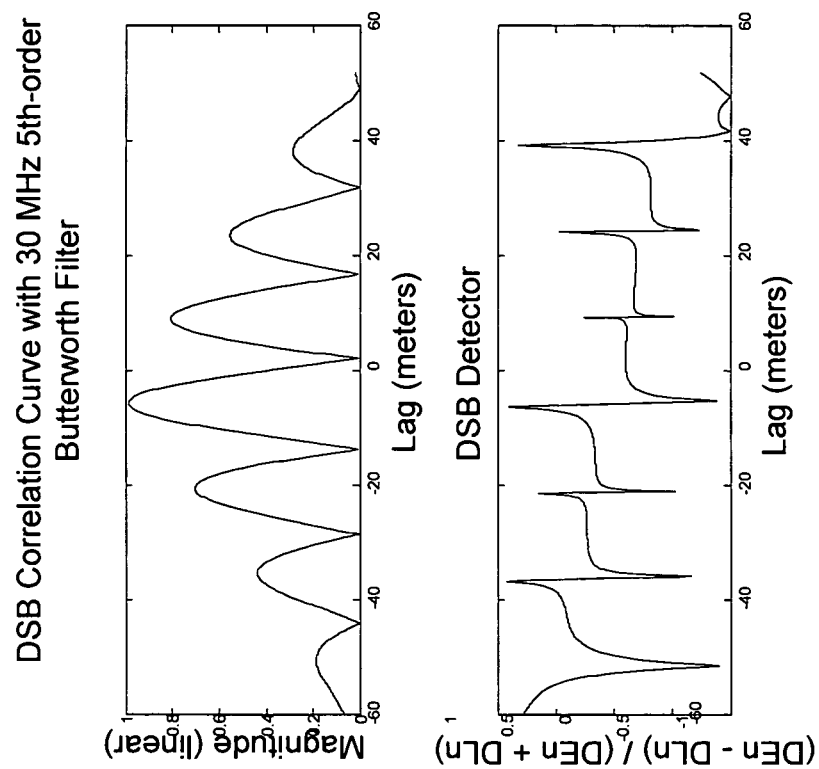
Figure 3. DSB Correlation Function Exhibiting Distortion Due to Filtering

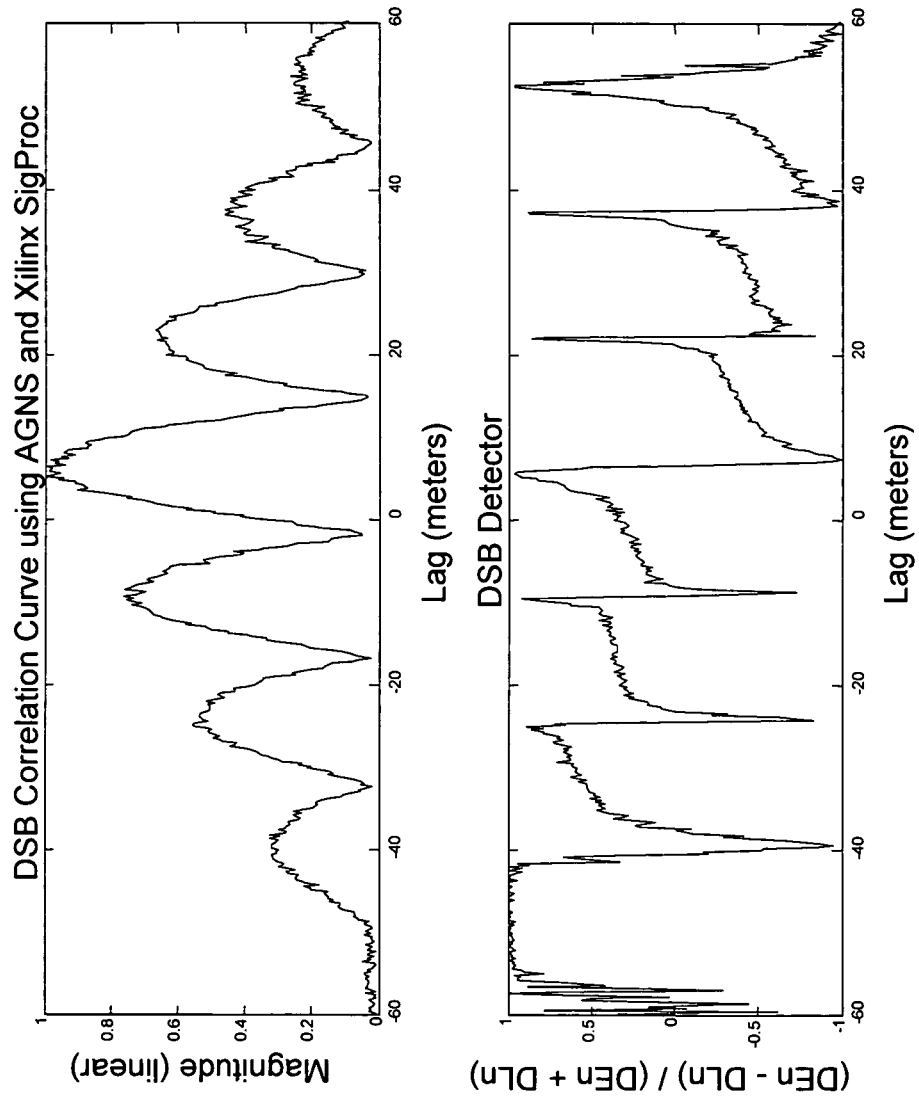
Figure 4. Hardware DSB Correlation Curve

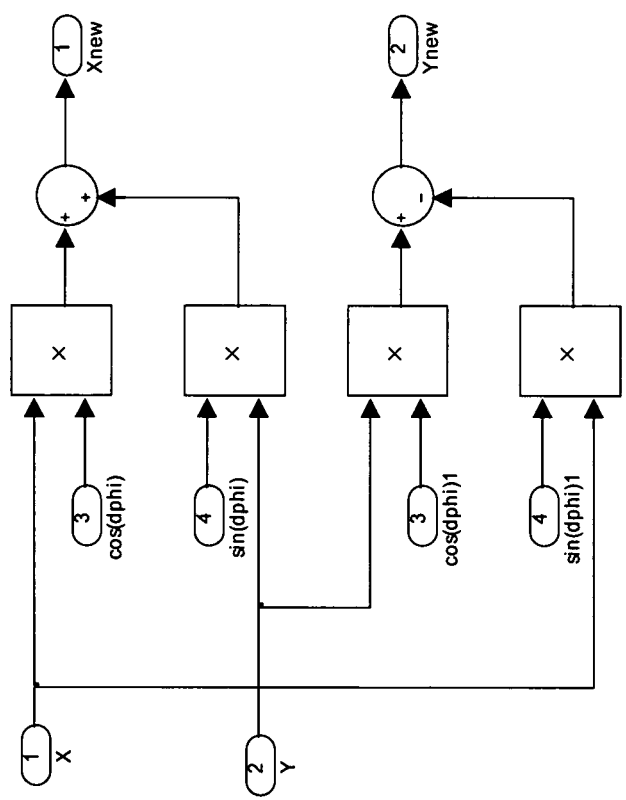
Figure 5. Post-correlation phase correction.

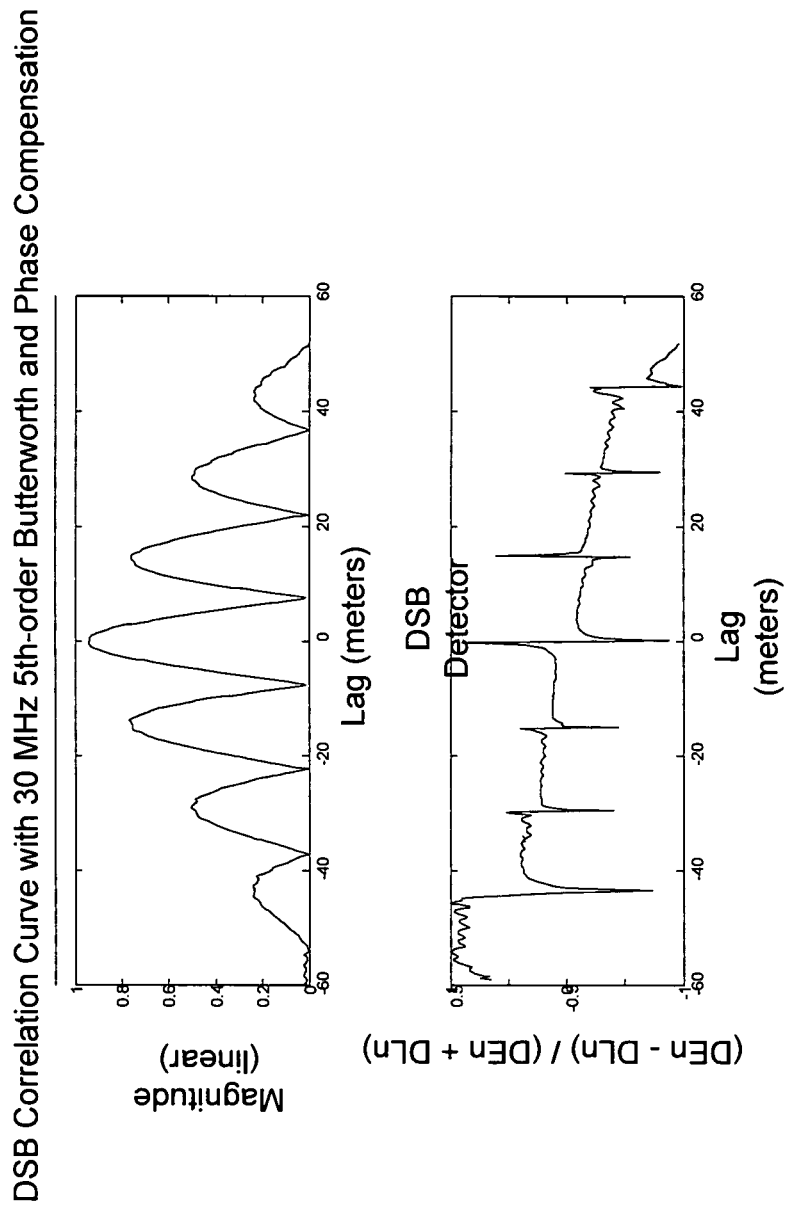
Figure 6. Phase compensated DSB correlation function.

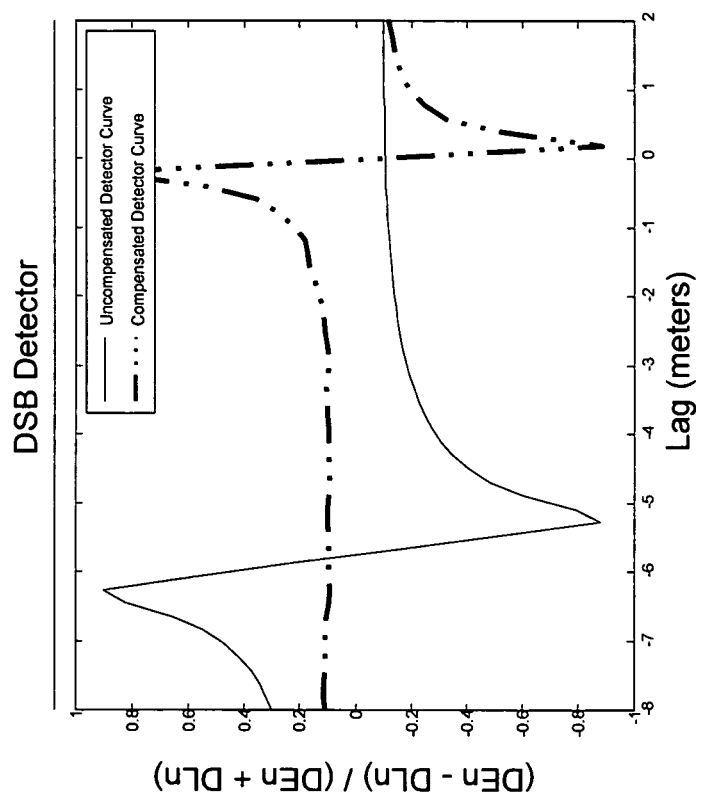
Figure 7. Compensated and Uncompensated DSB Detector Curves

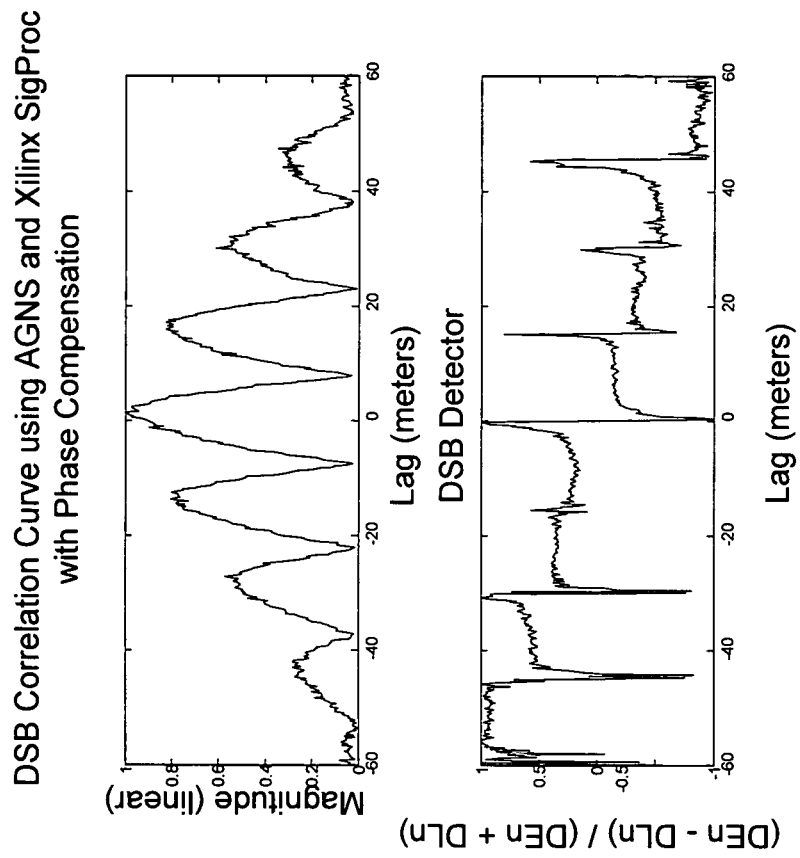
Figure 8. Hardware DSB Correlation Curve with Phase Compensation

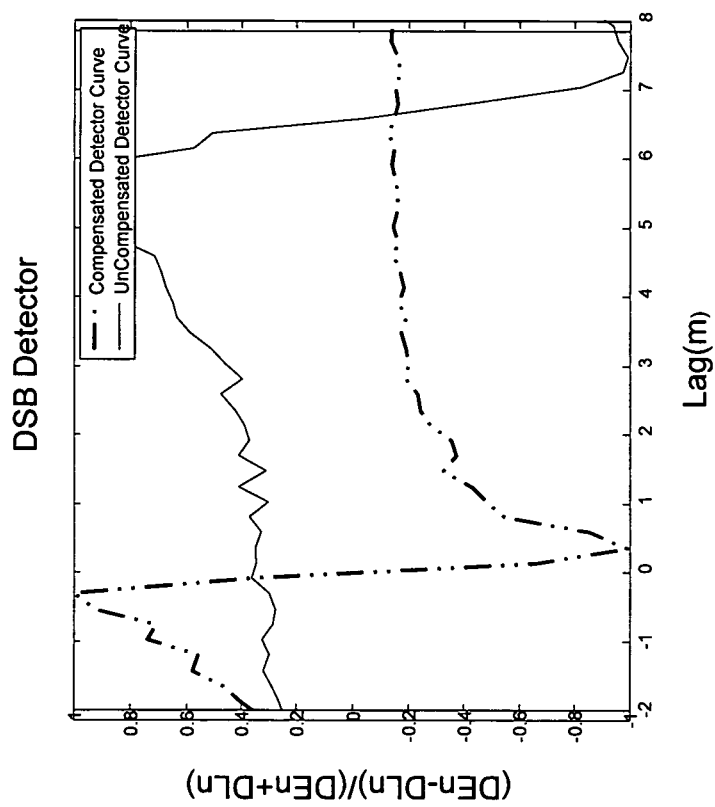
Figure 9. Hardware Compensated and Uncompensated DSB Detector Curves

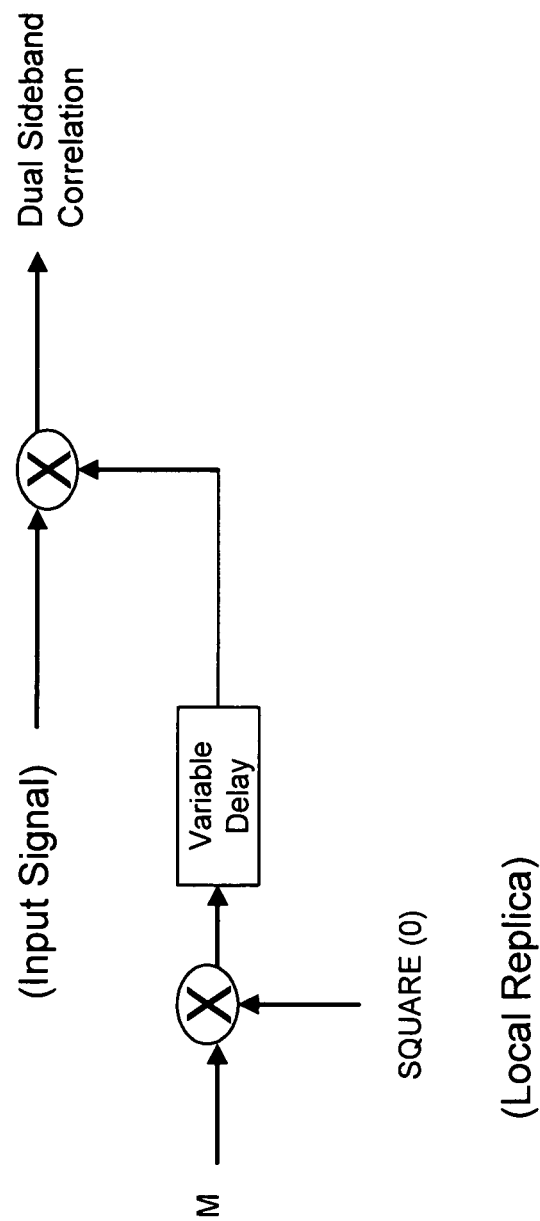
Figure 10. Dual Sideband Correlation

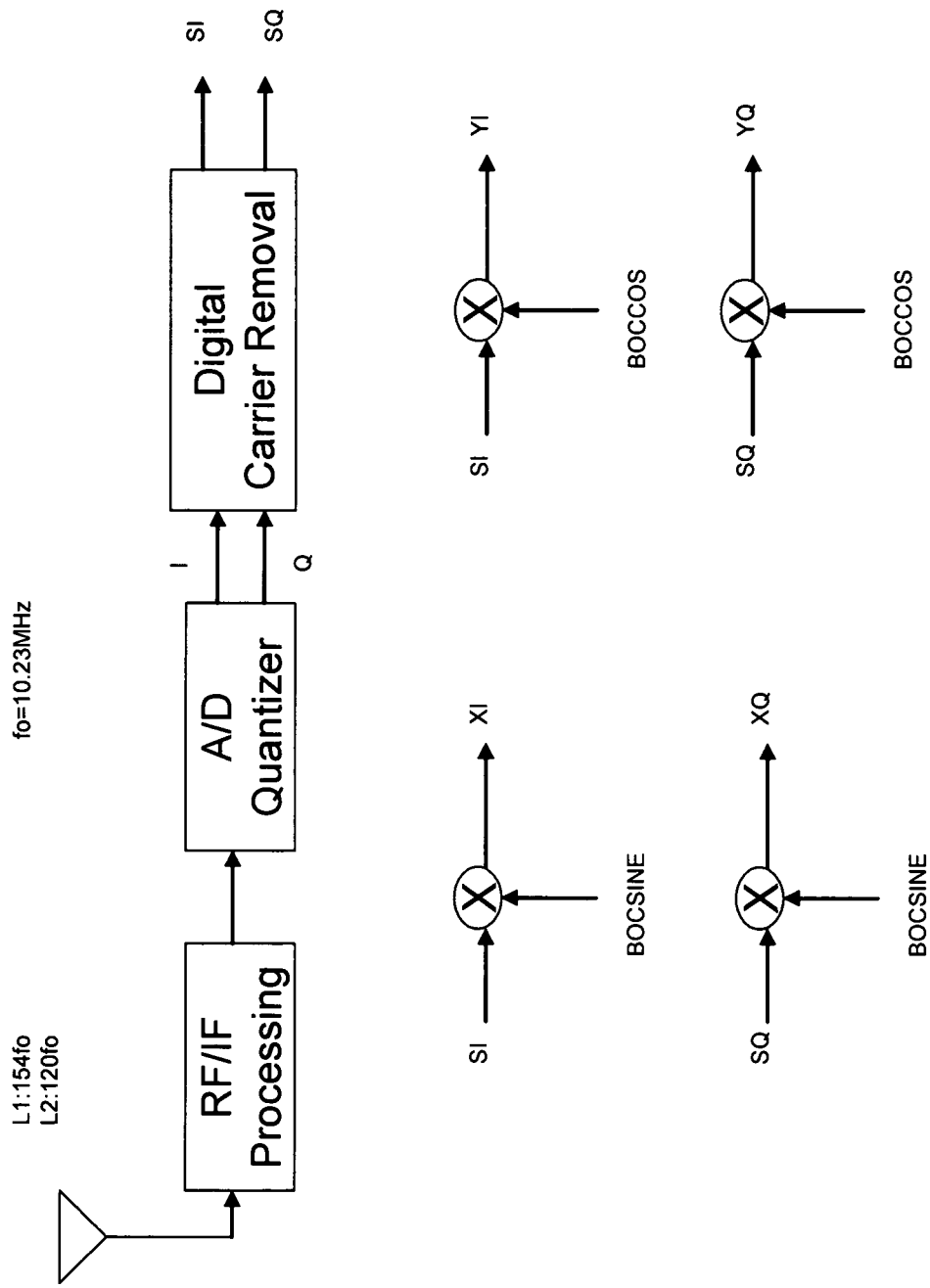
Figure 11. BOC Processing

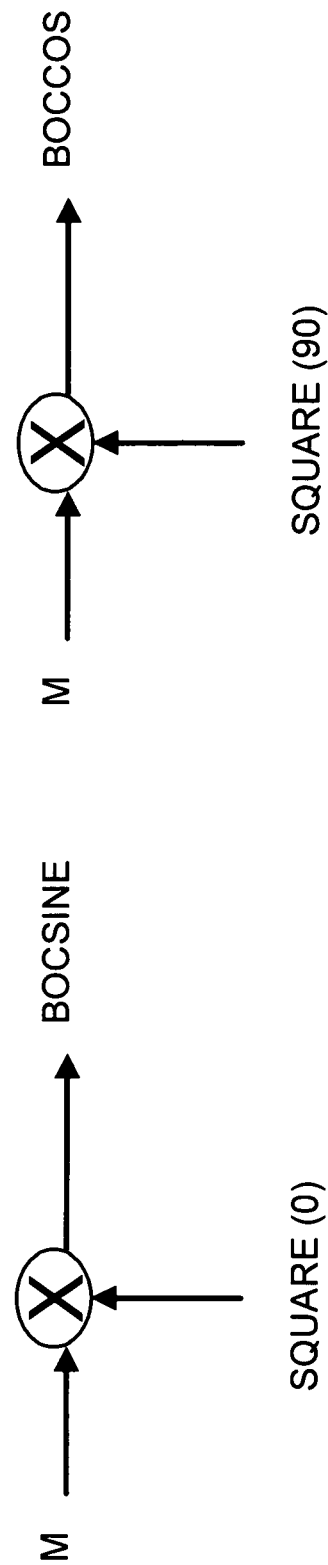
Figure 12. Replica Signals

PHASE COMPENSATION SYSTEM AND METHOD TO CORRECT M-CODE DUAL SIDEBAND DISTORTION

BACKGROUND

The invention generally relates to a compensation scheme for correcting signal distortion of the M-code signal for global positioning systems (GPS).

The global positioning system (GPS) Military Signal Design Team (GMSDT), led by the GPS Joint Program Office (JPO), has produced a recommended design of the new military signal for the L1 and L2 bands. The result is an M-code signal design, which is to be implemented in modernized satellites and in a new generation of receivers.

The motivations for GPS Modernization, as an essential part of GPS navigation warfare (NAVWAR), have been recognized. The objectives of the modernized military signal in the context of NAVWAR are protecting military use of GPS by the US and its allies, preventing hostile use of GPS, while preserving the peaceful use of the civil radionavigation service. Furthermore, Modernization entails improving performance of GPS service for both civilian and military users, while recognizing that the threat against the military user may continue to increase. Thus, the modernization objective was to design a signal that provides functions, performance, and flexibility for an enhanced military radionavigation service, while ensuring that current military and civilian receivers continue to operate with the same or better performance as they do today.

The M-code signal design provides better jamming resistance than the Y-code signal, primarily through enabling transmission at much higher power without interference with C/A-code or Y-code receivers. The M-code signal also will be compatible with prevention jamming against enemy use of GPS. The design will provide more robust signal acquisition than is achieved in conventional GPS, while offering better security in terms of exclusivity, authentication, and confidentiality, along with streamlined key distribution. In other aspects, the M-code signal will provide at least comparable performance to the Y-code signal, and preferable better performance. It also should provide more flexibility than the Y-code signal offers.

While providing these benefits, the M-code signal must coexist with current signals on L1 and L2, not interfering with current or future civilian or military user equipment. Further, it will be simple and low-risk to implement both on space vehicles and in future user equipment. In particular, since transmit power on the spacecraft is both limited and in high demand for many applications, the M-code signal design and the overall signal architecture will be as power efficient as possible.

The modulation of the M-code signal is a binary offset carrier (BOC) signal with subcarrier frequency 10.23 MHz and spreading code rate of 5.115 M spreading bits per second denoted a BOC(10.23,5.115) (abbreviated as BOC(10,5)) modulation. Spreading and data modulations employ biphase modulation, so that the signal occupies one phase quadrature channel of the carrier. The spreading code is a pseudorandom bit stream from a signal protection algorithm, having no apparent structure or period.

The baseline acquisition approach uses direct acquisition of the M-code navigation signal, obtaining processing gain through the use of large correlator circuits in the user equipment.

As enabled by the satellite's RF and antenna designs, a given satellite may transmit two different M-code signals, at each carrier frequency (but physically different carriers). This allows for a lower power signal with wide enough angular coverage for earth and space users (termed the earth coverage signal), in conjunction with a higher power signal transmitted in a spot beam (the spot signal) for greater antijam (AJ) from space in a localized region. These two M code signals, while transmitted from the same satellite at the same carrier frequency, are distinct signals with different carriers, spreading codes, data messages, and other aspects.

Because of the unique characteristics of BOC signals, there is a need for compensating for the phase difference between the upper and lower sidebands due to distortion effects.

The techniques herein below extend to those embodiments which fall within the scope of the appended claims, regardless of whether they accomplish one or more of the above-mentioned needs.

SUMMARY

What is provided is a method of generating a position. The method comprises receiving from a transmitter a BOC signal. The method also comprises down converting the received BOC signal to a baseband signal. Further, the method comprises processing the converted baseband signal to remove errors due to phase distortion of the BOC signal.

What is also provided is an alternative method of generating a position. The method comprises receiving from a transmitter an M-code signal, the M-code signal modulated with a pseudorandom number sequence. The method also comprises down converting the received M-code signal to a baseband signal. Further, the method comprises correlating the baseband signal with a known pseudorandom number sequence. Further still, the method comprises processing the converted baseband signal to remove errors due to phase distortion of the M-code signal.

Further, what is provided is an apparatus for generating a position. The apparatus comprises a means for receiving from a transmitter an M-code signal, the M-code signal modulated with a pseudorandom number sequence. The apparatus also comprises a means for down converting the received M-code signal to a baseband signal and a means for correlating the baseband signal with a known pseudorandom number sequence. Further, the method comprises a means for processing the converted baseband signal to remove errors due to phase distortion of the M-code signal.

Alternative exemplary embodiments relate to other features and combinations of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which:

FIG. 1 is an exemplary plot of a conventional filter depicting how the phase response is nonlinear;

FIG. 2 is an exemplary error plot of the data provided in FIG. 1;

FIG. 3 is an exemplary simulated plot of the double sideband correlation curve and detector output for a conventional filter;

FIG. 4 is an exemplary plot similar to that of FIG. 1, but measured after being implemented in hardware;

FIG. 5 is an exemplary block diagram of the post-correlation phase correction process;

FIG. 6 is an exemplary plot of the corrected DSB detector output;

FIG. 7 is an exemplary comparison between compensated and uncompensated DSB detector curves;

FIG. 8 is an exemplary plot of hardware implemented example of the corrected DSB detector output;

FIG. 9 is an exemplary plot of a comparison between hardware implemented compensated and uncompensated DSB detector output;

FIG. 10 is an exemplary diagram of the DSB correlation;

FIG. 11 is an exemplary diagram of the BOC processing technique; and

FIG. 12 is an exemplary diagram of replica signals used in BOCI/BOCQ processing.

DETAILED DESCRIPTION

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Because the M-code signal utilizes binary offset carrier (BOC) modulation to move signal energy away from band center, the M-code signal has two main lobes referred to as the upper and lower sidebands which are centered at ±10.23 MHz from band center. The received GPS signal is down-converted from RF to base-band for the correlation process. Due to filtering in the down-conversion process and transmit path effects (i.e. ionoshperic effects) the propagation/processing channel has non-linear phase. Forming the M-code double sideband (DSB) correlation function involves correlating the received M-code signal with a local replica of the BOC signal. Due to the non-linear characteristics of the channel, the DSB correlation function exhibits correlation loss and distortion. Accordingly, there is need for an exemplary innovative solution that takes advantage of a signal processing approach that provides correlator output 90° out of phase, as may be constructed by those of ordinary skill in the art, to efficiently compensate for the phase difference between the upper and lower sidebands.

In order to generate the dual sideband correlation it is necessary to mix the incoming signal with a local replica of the BOC signal. This may be relatively straightforward and is shown in FIG. 10 by way of example.

The "SQUARE (0)" signal represents the square wave signal used to modulate the M-code pseudorandom number (PRN) sequence.

In addition to generating the dual sideband correlation the military user equipment (MUE) may also form single sideband correlations. The single sideband correlations can be generated in several ways. The "traditional" processing would involve separate carrier removals for the upper and lower sidebands. This approach may be relatively straightforward and is not discussed further.

An alternative technique for generating the single sideband correlations involves using two replica signals as shown in FIG. 11. This technique will be referred to as "BOCI/BOCQ Processing."

The BOCI/BOCQ processing technique requires another replica signal in addition to the signal used for the dual sideband correlation discussed above. Both of these replica signals are shown in FIG. 12.

These replica signals are similar. In each case a square wave signal is used to modulate the local M-code PRN sequence. These square wave signals differ only in relative phase. The BOCSINE signal is 90 degrees offset from the BOCCOS signal. The dual sideband correlation response and the single sideband correlation responses can be formed using different linear combination of the correlator outputs XI, XQ, YI, and YQ.

In accordance with an exemplary embodiment, the compensation problem is solved by applying a complex rotation to the BOCI/BOCQ correlator output. The complex rotation corrects for the non-linear component of the processing channel's phase response. Below is a brief derivation and description of the phase compensation technique.

The received L-band GPS signal is down-converted from RF to base-band for the correlation process. Down-converting the RF signal typically involves analog filters that do not possess a linear phase response across the pass-band. Forming the M-code DSB correlation function involves correlating the received M-code signal with a local replica of the BOC signal. Due to the non-linear characteristics of the channel, the DSB correlation function exhibits correlation loss and distortion.

A similar effect due to ionospheric phase advance is observed as the signal passes through the ionosphere. The distortion due specifically to ionospheric effects is similar to those observed from filtering the RF signal with analog filters. Therefore the distortion will be described in the context of RF processing.

The distortion may be demonstrated by examining a simple fifth-order Butterworth filter as shown in FIG. 1. The filter's phase response deviates from that of a linear phase response across the pass-band. The difference between the phase response and the linear fit or the residual phase is shown in FIG. 2.

Mathematically, this can be approximated as separate phase components $\phi_U$ and $\phi_L$, on the upper and lower sidebands, respectively, of the base-banded complex signal, Base-banded Complex Signal.

$$S_I(t) = \frac{1}{2} M_U(t) \cdot \sin(\omega_0 t - \theta + \varphi_U) + \frac{1}{2} M_L(t) \cdot \sin(\omega_0 t + \theta - \varphi_L)$$

Equation 1

$$S_Q(t) = \frac{1}{2} M_U(t) \cdot \cos(\omega_0 t - \theta + \varphi_U) - \frac{1}{2} M_L(t) \cdot \cos(\omega_0 t + \theta - \varphi_L)$$

The received base-banded complex signal given in Equation 1 is correlated with two replica signals designated BOCSINE and BOCCOS. The correlation process yields, Correlators.

$$X_I(\tau) = \frac{1}{4}E[M(t-\tau)M_U(t)]\cos(\omega_0\tau - \theta + \varphi_U) +$$
$$\frac{1}{4}E[M(t-\tau)M_L(t)]\cos(\omega_0\tau + \theta - \varphi_L)$$

$$X_Q(\tau) = -\frac{1}{4}E[M(t-\tau)M_U(t)]\sin(\omega_0\tau - \theta + \varphi_U) +$$
$$\frac{1}{4}E[M(t-\tau)M_L(t)]\sin(\omega_0\tau + \theta - \varphi_L)$$

$$Y_I(\tau) = \frac{1}{4}E[M(t-\tau)M_U(t)]\sin(\omega_0\tau - \theta + \varphi_U) +$$
$$\frac{1}{4}E[M(t-\tau)M_L(t)]\sin(\omega_0\tau + \theta - \varphi_L)$$

$$Y_Q(\tau) = \frac{1}{4}E[M(t-\tau)M_U(t)]\cos(\omega_0\tau - \theta + \varphi_U) -$$
$$\frac{1}{4}E[M(t-\tau)M_L(t)]\cos(\omega_0\tau + \theta - \varphi_L)$$

Equation 2 where

E[ ] is the expected value operator.

Furthermore, the power in the double sideband correlation function is computed as, DSB Correlation Function.

$$|DSB(\tau)|^2 = X_I(\tau)^2 + X_Q(\tau)^2$$
$$= \frac{1}{16}\begin{bmatrix} E[M(t-\tau)M_U(t)]^2 + E[M(t-\tau)M_L(t)]^2 + \\ 2 \cdot E[M(t-\tau)M_U(t)] \cdot \\ E[M(t-\tau)M_L(t)]\cos(2\omega_0\tau + \varphi_U - \varphi_L) \end{bmatrix}$$

Equation 3

The ideal double sideband signal power is given by,

Ideal DSB Correlation Function.

$$|DSB_{ideal}(\tau)|^2 =$$
$$\frac{1}{16}\begin{bmatrix} E[M(t-\tau)M_U(t)]^2 + E[M(t-\tau)M_L(t)]^2 + \\ 2 \cdot E[M(t-\tau)M_U(t)] \cdot \\ E[M(t-\tau)M_L(t)]\cos(2\omega_0\tau) \end{bmatrix}$$

Equation 4 which does not contain the phase terms $\varphi_U$ and $\varphi_L$. These phase terms, or more specifically their difference distorts the DSB correlation function from the ideal. This distortion has been observed through simulation and lab testing. FIG. 3 shows simulation data illustrating the DSB correlation curve distortion resulting from filtering the M-code signal with the fifth-order Butterworth filter. FIG. 4 illustrates correlation curve distortion using an exemplary Advanced Global Navigation System (AGNS) data processed through an exemplary Defense Advanced GPS Receiver Anti Jam (DAGR AJ) RF down-converter and an exemplary Xilinx field programmable gate array FPGA tracking signal processor.

The asymmetry and skewing of the peak response in the DSB correlation curve due to the upper and lower sideband phase differences produces a bias in the DSB detector. The detector bias in turn causes an error in the measured pseudorange. The exemplary correlation curves presented in FIG. 3 and FIG. 4 show the distortion and hence the bias in opposite directions. This is due to the fact that the signal processing in the exemplary Xilinx FPGA selects the negative intermediate frequency (IF) image of the received signal whereas the simulation selects the positive IF image of the received signal. Therefore, the phase of the processed signals rotate in opposite directions in turn causing the correlation bias to be in opposite directions.

In accordance with an exemplary embodiment, several methods to correct the effects due to phase distortion are possible. One method is to provide separate carrier removals for the upper and lower sidebands and independently apply a phase adjustment to each sideband to compensate for the difference in phase.

An alternative method is an innovative approach to compensate for the phase difference between the upper and lower sidebands that takes advantage of the 90° out of phase correlator outputs produced when using BOCI/BOCQ signal processing technique. This approach has a minimal effect on receiver design and is described in more detail below.

A preferred technique takes advantage of a BOC processing approach to efficiently compensate for the phase difference between the upper and lower sidebands. This technique compensates for the non-linear phase response of the processing channel by applying a complex rotation to a combination of the BOCSINE and BOCCOS correlator outputs. Hence the phase adjustment only needs to be applied at the post detection integration (PDI) rate.

Equation 5 and Equation 6 provide the phase adjustment and correlation function power using the complex expressions of $(X_1-j\cdot Y_1)$, $(X_Q-j\cdot Y_Q)$ and $e^{j\partial\phi}$, where $\partial\phi$ is given by $(\phi_L-\phi_U)/2$. Furthermore, it can be shown that computing the received carrier phase of the signal using, $$\tan^{-1}\left(\frac{\tilde{X}_Q(\tau)}{\tilde{X}_I(\tau)}\right),$$

produces the desired result, $\theta$.

Applied Phase Adjustment.

$$\tilde{X}_I(\tau) = \frac{1}{4}E[M(t-\tau)M_U(t)]\cos(\omega_0\tau - \theta + \varphi_U + \partial\varphi) +$$
$$\frac{1}{4}E[M(t-\tau)M_L(t)]\cos(\omega_0\tau + \theta - \varphi_L + \partial\varphi)$$

$$\tilde{X}_Q(\tau) = -\frac{1}{4}E[M(t-\tau)M_U(t)]\sin(\omega_0\tau - \theta + \varphi_U + \partial\varphi) +$$
$$\frac{1}{4}E[M(t-\tau)M_L(t)]\sin(\omega_0\tau + \theta - \varphi_L + \partial\varphi)$$

$$\tilde{Y}_I(\tau) = \frac{1}{4}E[M(t-\tau)M_U(t)]\sin(\omega_0\tau - \theta + \varphi_U + \partial\varphi) +$$
$$\frac{1}{4}E[M(t-\tau)M_L(t)]\sin(\omega_0\tau + \theta - \varphi_L + \partial\varphi)$$

$$\tilde{Y}_Q(\tau) = \frac{1}{4}E[M(t-\tau)M_U(t)]\cos(\omega_0\tau - \theta + \varphi_U + \partial\varphi) -$$
$$\frac{1}{4}E[M(t-\tau)M_L(t)]\cos(\omega_0\tau + \theta - \varphi_L + \partial\varphi)$$

Equation 5

DSB Correlation Function.

$$|DSB(\tau)|^2 = \tilde{X}_I(\tau)^2 + \tilde{X}_Q(\tau)^2 \quad \text{Equation 6}$$

$$= \frac{1}{16} \begin{bmatrix} E[M(t-\tau)M_U(t)]^2 + \\ E[M(t-\tau)M_L(t)]^2 + \\ 2 \cdot E[M(t-\tau)M_U(t)] \cdot E[M(t-\tau)M_L(t)]\cos(2\omega_0\tau + \varphi_U - \varphi_L + 2\partial\varphi) \end{bmatrix}$$

$$= \frac{1}{16} \begin{bmatrix} E[M(t-\tau)M_U(t)]^2 + E[M(t-\tau)M_L(t)]^2 + \\ 2 \cdot E[M(t-\tau)M_U(t)] \cdot \\ E[M(t-\tau)M_L(t)]\cos(2\omega_0\tau) \end{bmatrix}$$

$$= |DSB_{ideal}(\tau)|^2$$

FIG. 5 depicts a block diagram of the post correlation phase compensation. Keep in mind, this processing only needs to occur at the PDI rate.

FIG. 6 depicts the corrected DSB correlation curve resulting from filtering the M-code signal with the fifth-order Butterworth filter and then applying the post-correlation phase compensation technique just described. Notice that the symmetry of the DSB correlation curve has been restored. FIG. 7 depicts the difference between the uncompensated detector zero crossing exhibiting a bias of approximately 6 meters and the corrected detector zero crossing.

After implementing the post-correlation phase correction algorithm from FIG. 5 in the target DSP, actual hardware data (FIG. 8) also showed correlation curve symmetry improvement when compared to the uncompensated phase data (FIG. 4). Similar to the simulation data, FIG. 9 shows the uncompensated detector zero crossing exhibits a bias of approximately 6 meters.

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

The invention claimed is:

1. A method of generating a position, comprising:
receiving from a transmitter a binary offset carrier (BOC) signal, the BOC signal including an upper sideband signal and a lower sideband signal;
down converting the received BOC signal to a baseband signal by using filters, the filters lacking linear phase response across a pass-band;
correlating the BOC signal with a first replica signal and a second replica signal, the first replica signal and the second replica signal being square wave signals, the first replica signal being a BOCSINE replica signal, the second replica signal being a BOCCOS replica signal, the BOCSINE replica signal being ninety degrees out-of-phase relative to the BOCCOS replica signal, wherein correlating provides a plurality of correlator outputs, the plurality of correlator outputs including a BOCSINE correlator output and a BOCCOS correlator output, the BOCSINE correlator output being ninety degrees out-of-phase relative to the BOCCOS correlator output; and
processing the converted baseband signal to remove errors due to phase distortion of the BOC signal, wherein the processing includes applying a complex rotation to a combination of the BOCSINE correlator output and the BOCCOS correlator output, the complex rotation correcting for a non-linear component of a phase response of a processing channel, the processing channel having a non-linear phase, said processing being carried out at a post detection integration (PDI) rate.

2. The method of claim 1, further comprising:
providing separate carrier removals for the upper and lower sidebands and independently applying a phase adjustment to each sideband to compensate for the phase difference.

3. The method of claim 1, further comprising:
repeating the receiving, down converting and processing steps with signals from more than one transmitter.

4. The method of claim 1, wherein the transmitters are space-based transmitters.

5. The method of claim 1, wherein at least one of the filters is a Butterworth filter.

6. A method of generating a position, comprising:
receiving from a transmitter an M-code signal, the M-code signal modulated with a pseudorandom number sequence, the M-code signal including an upper sideband signal and a lower sideband signal;
down converting the received M-code signal to a baseband signal by using filters, the filters lacking linear phase response across a pass-band;
correlating the baseband signal with a first replica signal and a second replica signal, the first replica signal and the second replica signal being square wave signals, the first replica signal being a BOCSINE replica signal, the second replica signal being a BOCCOS replica signal, the BOCSINE replica signal being ninety degrees out-of-phase relative to the BOCCOS replica signal, wherein correlating provides a plurality of correlator outputs, the plurality of correlator outputs including a BOCSINE correlator output and a BOCCOS correlator output, the BOCSINE correlator output being ninety degrees out-of-phase relative to the BOCCOS correlator output; and
processing the converted baseband signal to remove errors due to phase distortion of the M-code signal, wherein the processing includes applying a complex rotation to a combination of the BOCSINE correlator output and the BOCCOS correlator output, the complex rotation correcting for a non-linear component of a phase response of a processing channel, the processing channel having a non-linear phase, said processing being carried out at a post detection integration (PDI) rate.

7. The method of claim 6, further comprising:
providing separate carrier removals for the upper and lower sidebands and independently applying a phase adjustment to each sideband to compensate for the phase difference.

8. The method of claim 6, further comprising:
repeating the receiving, down converting and processing steps with signals from more than one transmitter.

9. The method of claim 8, further comprising:
converting the correlation data to position data.

10. The method of claim 6, wherein the transmitters are space-based transmitters.

11. The method of claim 6, wherein at least one of the filters is a Butterworth filter.

12. An apparatus for generating a position, comprising:
means for receiving from a transmitter an M-code signal, the M-code signal modulated with a pseudorandom number sequence, the M-code signal including an upper sideband signal and a lower sideband signal;
means for down converting the received M-code signal to a baseband signal by using filters, the filters lacking linear phase response across a pass-band;
means for correlating the baseband signal with a first replica signal and a second replica signal, the first replica signal and the second replica signal being square wave signals, the first replica signal being a BOCSINE replica signal, the second replica signal being a BOCCOS replica signal, the BOCSINE replica signal being ninety degrees out-of-phase relative to the BOCCOS replica signal, wherein correlating provides a plurality of correlator outputs, the plurality of correlator outputs including a BOCSINE correlator output and a BOCCOS correlator output, the BOCSINE correlator output being ninety degrees out-of-phase relative to the BOCCOS correlator output; and
means for processing the converted baseband signal to remove errors due to phase distortion of the M-code signal, wherein the correlation is accomplished by applying a complex rotation to a combination of the BOCSINE correlator output and the BOCCOS correlator output, the complex rotation correcting for a non-linear component of a phase response of a processing channel, the processing channel having a non-linear phase, said processing being carried out at a post detection integration (PDI) rate.

13. The apparatus of claim 12, wherein at least one of the filters is a Butterworth filter.

\* \* \* \* \*